US007768966B2

(12) United States Patent
Yoon et al.

(10) Patent No.: US 7,768,966 B2
(45) Date of Patent: Aug. 3, 2010

(54) METHOD FOR TRAFFIC INDICATION AND CHANNEL ADAPTATION FOR SLEEP MODE TERMINALS, AND AN APPARATUS THEREOF

(75) Inventors: Chul-Sik Yoon, Daejeon (KR); Jae-Heung Kim, Daejeon (KR); Kun-Min Yeo, Daejeon (KR); Byung-Han Ryu, Daejeon (KR)

(73) Assignees: Electronics and Telecommunications Research Institute (KR); Samsung Electronics Co., Ltd. (KR); KT Corporation (KR); KTFreetel Co., Ltd. (KR); Hanaro Telecom., Inc. (KR); SK Telecom. Co, Ltd. (KR)

( * ) Notice: Subject to any disclaimer, the term of this patent is extended or adjusted under 35 U.S.C. 154(b) by 396 days.

(21) Appl. No.: 10/585,202

(22) PCT Filed: Jan. 3, 2005

(86) PCT No.: PCT/KR2005/000003

§ 371 (c)(1),
(2), (4) Date: Oct. 17, 2008

(87) PCT Pub. No.: WO2005/065056

PCT Pub. Date: Jul. 21, 2005

(65) Prior Publication Data

US 2009/0067374 A1 Mar. 12, 2009

(51) Int. Cl.
*H04W 72/04* (2009.01)
(52) U.S. Cl. ............... 370/329; 455/452.2; 455/517; 455/455; 370/252; 370/204

(58) Field of Classification Search ........... 370/329, 370/252, 204; 455/452.2, 517, 455, 522
See application file for complete search history.

(56) References Cited

U.S. PATENT DOCUMENTS

| 5,914,796 | A | 6/1999 | Selin | |
|---|---|---|---|---|
| 2003/0054847 | A1* | 3/2003 | Kim et al. | 455/517 |
| 2003/0148770 | A1* | 8/2003 | Das et al. | 455/455 |
| 2004/0142698 | A1* | 7/2004 | Pietraski | 455/452.2 |
| 2005/0289256 | A1* | 12/2005 | Cudak et al. | 710/62 |

FOREIGN PATENT DOCUMENTS

CA    2 447 255  A1    4/2002

* cited by examiner

*Primary Examiner*—David Q Nguyen
(74) *Attorney, Agent, or Firm*—The Farrell Law Firm, LLP

(57) ABSTRACT

The traffic indication and channel adaptation apparatus for a subscriber station in a sleep mode according to the present invention includes: a channel resource allocator for generating resource allocation information allocating an uplink channel resource to the subscriber station; a traffic indication and channel adaptation controller for generating a traffic indication message transmitted with the resource allocation information to the subscriber station, and providing a downlink data having a transmission level determined by applying an AMC level according to a CQI report message transmitted from the subscriber station; a transmitter for transmitting the uplink resource allocation information, the traffic indication message, and the downlink data to the subscriber station; and a receiver from receiving a CQI codeword or a CQI report message.

25 Claims, 12 Drawing Sheets

FIG.11

```
[Traffic indication message]
Traffic_Indication_Message_Format() {
        Management Message Type, // 8-bit
        Offset, // 8 bits, Offset information on CQI report channel
        Number of Basic CIDs N, // 8-bit
        CQI report indication, // cell(N/8)*8bits; Flag for determining to
perform CQI report
        for (i = 0; i < N; i++)
        {
            Basic Connection ID, // 16-bit, CID to which this is message
refers
        }
    }
```

[Compressed (channel quality information) report-response message]

```
Compressed_Report_Response_Message_Format() {
        Mean, // 8-bit
        Standard Deviation, // 8-bit
        }
```

METHOD FOR TRAFFIC INDICATION AND CHANNEL ADAPTATION FOR SLEEP MODE TERMINALS, AND AN APPARATUS THEREOF

BACKGROUND OF THE INVENTION (a) Field of the Invention

The present invention relates to a method for traffic indication and channel adaptation for terminals in a sleep mode, and an apparatus therefore. More specifically, the present invention relates to a method and apparatus for allowing a terminal in a sleep mode to enter an awake mode by a traffic indication and adaptively transmitting data according to channel quality information (CQI) of the terminal in a mobile communication or a wireless portable internet system.

(b) Description of the Related Art

The wireless portable internet system is a next generation communication system providing further mobility to short-distance data communication using a stationary access point in a like manner of a wireless local area network (LAN).

Various international standards for the wireless portable internet system have been suggested by the IEEE 802.16e working group.

As to a conventional traffic indication and channel adaptation method, when traffic occurs at a subscriber station in the sleep mode, the subscriber station enters to the awake mode according to a traffic indication message, and downlink data are transmitted to the subscriber station, and hence, it is difficult to apply an appropriate adaptive modulation and coding level to the subscriber station.

With reference to FIGS. 1 and 2, a conventional traffic indication and channel adaptation process for the subscriber station in the sleep mode will be described. FIG. 1 shows a diagram representing the conventional traffic indication and channel adaptation process for the subscriber station in the sleep mode. At this time, a transverse axis represents a time progress, BS denotes a base station, and SS denotes a subscriber station.

As shown in FIG. 1, a subscriber station SS receives a traffic indication (TRF-IND) message from a base station BS in step S101, and acknowledges the presence of downlink traffic for the subscriber station SS. The subscriber station SS requests a bandwidth by transmitting a bandwidth request (BW-REQ) message to the base station in order to report channel quality information (CQI) in step S102 when a radio channel of the subscriber station SS is different from the same in the sleep mode.

The subscriber station receives an uplink resource allocation (UL-MAP) message from the base station BS, and an uplink resource for transmitting a CQI result is allocated in step S103.

The subscriber station SS reports the channel quality estimation result to the base station BS by using the uplink resource in step S104. In detail, the subscriber station SS reports the channel quality estimation result by transmitting a ranging request (RNG-REQ) message having a report-response (REP-RSP) message, a downlink burst profile change request (DBPC-REQ) message, or a preferred burst profile (Preferred-DIUC) value as parameters to the base station BS.

The base station BS transmits downlink data (user data) in step S105 by applying the appropriate adaptive modulation and coding level for the subscriber station SS with reference to the channel quality estimation result.

However, a delay caused by the uplink bandwidth request and allocation in steps S101 and S102 is inevitably provided until the channel quality estimation result is reported to the base station BS in step S104 because the uplink resource allocation for reporting the channel quality estimation result is not premised. Accordingly, it is difficult to deal with quick changes of channel environments, and to satisfy the quality of service (QoS).

FIG. 2 shows a diagram representing a traffic indication and channel adaptation process for the subscriber station in the sleep mode when a contention based bandwidth is requested.

As shown in FIG. 2, the subscriber station SS receives the traffic indication (TRF-IND) message from the base station BS in step S201, acknowledges the presence of downlink traffic for the subscriber station SS, and transmits a contention-based bandwidth request (Contention-based BW-REQ) message to the base station BS in step S202. At this time, a timer for waiting for a response message expires when the bandwidth request is failed due to a conflict of the requests.

As described above, when the contention-based random access is failed, the subscriber station SS performs a backoff process in step S203 and reperforms the contention-based bandwidth request in step S204.

When the bandwidth request is successfully performed, the base station BS transmits the UL-MAP message to the subscriber station SS to allocate the uplink resource in step S205.

The subscriber station SS reports the channel quality estimation result by the uplink resource in step S206. At this time, the subscriber station SS reports a burst profile for downlink transmission which is the channel quality estimation result to the base station when the base station BS determines the modulation and coding level.

When determining the modulation and coding level, the subscriber is station SS uses the DBPC-REQ message to request the bandwidth for the purpose of using a predetermined profile. At this time, an unwanted delay may occur because the bandwidth request is performed in the contention based access, and therefore the radio resources may be wasted, and the appropriate adaptive modulation and coding level is difficult to determine.

In the conventional traffic indication method, the downlink data is transmitted to the subscriber station once the subscriber station is awakened by the traffic indication. Accordingly, it may be impossible for the subscriber station to receive the data because an actual channel environment is different from a channel environment acknowledged by the base station when the base station transmits the data by applying the modulation and coding level before the sleep mode.

The downlink data is transmitted by using the most effective modulation and coding method in order to prevent the above problem. However, it may cause the radio resources to be wasted. In addition, the downlink data transmitted by the base station is wasted when the subscriber station does not properly receive the traffic indication message because there is no acknowledgement for the traffic indication.

Furthermore, to determine the adaptive modulation and coding level in the prior art, the subscriber station requests the uplink bandwidth a random access and uses the allocated uplink resource to report the radio channel quality information when the subscriber station in the sleep mode receives the traffic indication.

However, it is still difficult to determine the appropriate adaptive modulation and coding level because the delay caused by the random access is inevitably generated, and the radio resources are also wasted by the unnecessary random access.

SUMMARY OF THE INVENTION

Technical Problem

The present invention provides a method and apparatus for traffic indication and channel adaptation for a subscriber station in a sleep mode applying an efficient modulation and channel coding level when the subscriber station in the sleep mode is awakened by the traffic indication and a data is transmitted to the terminal by adapting to a latest channel state in a mobile communication or wireless portable internet system.

The present invention also provides a method and apparatus for traffic indication and channel adaptation for a subscriber station in a sleep mode, quickly and reliably transmitting a channel quality information report and acknowledgement, with minimized signaling operation overhead, in a mobile communication or wireless portable internet system.

Technical Solution

The present invention discloses a traffic indication and channel adaptation apparatus for a subscriber station in a sleep mode in a wireless portable internet system. The traffic indication and channel adaptation apparatus includes: a channel resource allocator for generating resource allocation information allocating an uplink channel resource to the subscriber station in the sleep mode; a traffic indication and channel adaptation controller for generating a traffic indication (TRF-IND) message transmitted with the resource allocation information to the subscriber station in the sleep mode, and providing downlink data (user data) having a transmission level determined by applying an adaptive modulation and coding (AMC) according to a channel quality information report message transmitted from the subscriber station in the sleep mode; a transmitter for transmitting the uplink resource allocation information, the traffic indication message, or the downlink data (user data) to the subscriber station in the sleep mode; and a receiver for receiving a channel quality information codeword (CQI Codeword) or a channel quality information report (compressed REP-RSP) message transmitted from the subscriber station in the sleep mode awakened by the traffic indication message.

At this time, the resource allocation information and the traffic indication (TRF-IND) message are transmitted from the base station to the subscriber station at the same time or having a predetermined frame offset.

The traffic indication and channel adaptation apparatus further includes a parameter generator for generating a basic connection identifier for listing the respective subscriber stations in the sleep mode or a sleep mode identifier bitmap. The basic connection identifier and sleep mode identifier bitmap are included in the traffic indication (TRF-IND) message to be transmitted.

The traffic indication (TRF-IND) message includes an estimation parameter, a terminal, or offset information.

The traffic indication and channel adaptation controller establishes an exclusive channel for reporting the channel quality information of the subscriber station in the sleep mode.

The information for reporting the channel quality information is indicated according to an order of the listed subscriber stations in the sleep mode.

The traffic indication and channel adaptation controller provides request information to be selectively estimated and reported to a subscriber station requiring a fast data transmission among the subscriber station in the sleep mode.

The channel quality information report message or the channel quality information codeword is used as an acknowledgement ACK of a traffic indication message for the subscriber station in the sleep mode.

The channel quality information report message is framed divided into a predetermined size of information factors including values of mean and standard deviations according to the channel quality information estimation method, and transmitted through a channel for reporting the uplink channel quality information.

The channel quality information report message includes the channel quality information (CQI) and cyclic redundancy check (CRC) information.

The traffic indication and channel adaptation apparatus further includes: a traffic receiver for receiving traffic information through an internet network, and establishing an indicator indicating traffic for the subscriber station in the sleep mode in order that the subscriber station in the sleep mode enters an awake mode; a message analyzer for analyzing the channel quality information codeword or the channel quality information report message transmitted from the subscriber station in the sleep mode; and a subscriber station identifier for analyzing the transmitted basic connection identifier of the subscriber station in the sleep mode.

The present invention discloses a method for traffic indication and channel adaptation for a subscriber station in a sleep mode in a wireless portable internet system.

In the method, the base station generates a traffic indication (TRF-IND) message having indication information for a subscriber station to in which downlink traffic is generated among a plurality of subscriber stations in the sleep mode. The base station allocates an exclusive uplink channel for reporting channel quality information to the subscriber station. The base station transmits the traffic indication (TRF-IND) message and the exclusive uplink channel allocation information, and awakens the subscriber station by the traffic indication (TRF-IND) message. The base station receives a channel quality information report message or a channel quality information codeword (CQI Codeword) through the channel quality information exclusive channel. The base station transmits downlink data (user data) having a transmission level determined by applying an adaptive modulation and channel coding according to the channel quality information report reported by the subscriber station to the base station.

The traffic indication (TRF-IND) message provides exclusive channel usage information reporting the traffic indication and the channel quality information to the subscriber stations at the same time by one message for each frame when the base station generates a traffic indication (TRF-IND) message.

The traffic indication (TRF-IND) message includes an estimation parameter, a terminal identifier, or offset information when the base station generates a traffic indication (TRF-IND) message.

The traffic indication message is a broadcast message comprising identifier information of each subscriber station which is required to report the channel quality information.

A method for indicating the listed basic connection identifiers or a method for providing a flag in a bitmap method according to a predetermined order of the identifiers is used.

A message for an uplink resource allocation is used in order to allocate a resource for the channel quality information exclusive channel when the base station allocates the exclusive uplink channel, and detail information on the resource usage is provided through the traffic indication message.

The uplink resource is allocated for the purpose of transmitting the exclusive channel quality information for reporting the channel information transmitted from the plurality of subscriber stations at the same time when the base station allocates the exclusive uplink channel.

The subscriber station is selected to selectively report the channel quality information when the base station transmits the traffic indication (TRF-IND) message and the exclusive uplink channel allocation information.

A channel quality information codeword (CQI Codeword) or the channel quality information report (Compressed_REP-RSP) message is transmitted in a predetermined frame offset.

The present invention also discloses a method for indicating traffic for a subscriber station in a sleep mode in a wireless portable internet system.

In the method, a base station generates a traffic indication (TRF-IND) message having indication information for a subscriber station in which downlink traffic is generated among a plurality of subscriber stations in the sleep mode. The base station allocates an exclusive uplink channel for reporting channel quality information to the subscriber station. The base station transmits the traffic indication (TRF-IND) message and exclusive uplink channel allocation information (MAP), and awakens the subscriber station in the sleep mode by the traffic indication (TRF-IND) message. The base station receives a channel quality information report (Compressed_REP-RSP) message or a channel quality information codeword (CQI Codeword) according to channel quality changes of the subscriber station as a response to the traffic indication (TRF-IND) message through the channel quality information exclusive channel from the subscriber station awakened from the sleep mode.

Request information to be estimated and reported is selectively provided to a subscriber station requiring a fast data transmission among the subscriber stations in the sleep mode when the base station transmits the traffic indication (TRF-IND) message and the exclusive uplink channel allocation information (MAP).

The present invention discloses a method for channel adaptation for a subscriber station in a sleep mode in a wireless portable internet system.

In the method, a base station generates a traffic indication (TRF-IND) message having indication information for a subscriber station in which downlink traffic is generated among a plurality of subscriber stations in the sleep mode. The base station allocates an exclusive uplink channel for reporting channel quality information to the subscriber station. The base station transmits the traffic indication (TRF-IND) message and exclusive uplink channel allocation information (MAP), and awakens the subscriber station in the sleep mode by the traffic indication (TRF-IND) message. The base station receives a channel quality information report (Compressed_REP-RSP) message or a channel quality information codeword (CQI Codeword) according to channel quality changes of the subscriber station as a response to the traffic indication (TRF-IND) message through the channel quality information exclusive channel from the subscriber station awakened from the sleep mode. The base station applies an adaptive modulation and channel coding level according to the channel quality information report (Compressed_REP-RSP) message or the channel quality information codeword (CQI Codeword). The base station transmits downlink data having a transmission level determined by applying the adaptive modulation and channel coding to the subscriber station in the sleep mode.

The base station further transmits the data at the transmission level to the subscriber station receiving the downlink data.

ADVANTAGEOUS EFFECT

According to the present invention, when the subscriber station in the sleep mode is awakened by the traffic indication, the subscriber station acknowledges the uplink resources through which the estimation result is reported. It is acknowledged by an order of the terminal identifiers of the channel quality information report request field in the traffic indication message. Therefore the most adaptive modulation and channel coding level is determined by quickly applying the latest channel state when the data is transmitted to the subscriber station.

BRIEF DESCRIPTION OF THE DRAWINGS

FIG. 11 shows examples of a compressed channel quality information report message (Compressed_Report_Response_Message) format on an exclusive channel for reporting the channel quality information and a traffic indication (TRF_IND) message format for the subscriber station in the sleep mode in the wireless portable internet system according to the exemplary embodiment of the present invention.

DETAILED DESCRIPTION OF THE PREFERRED EMBODIMENTS

Figure 1:
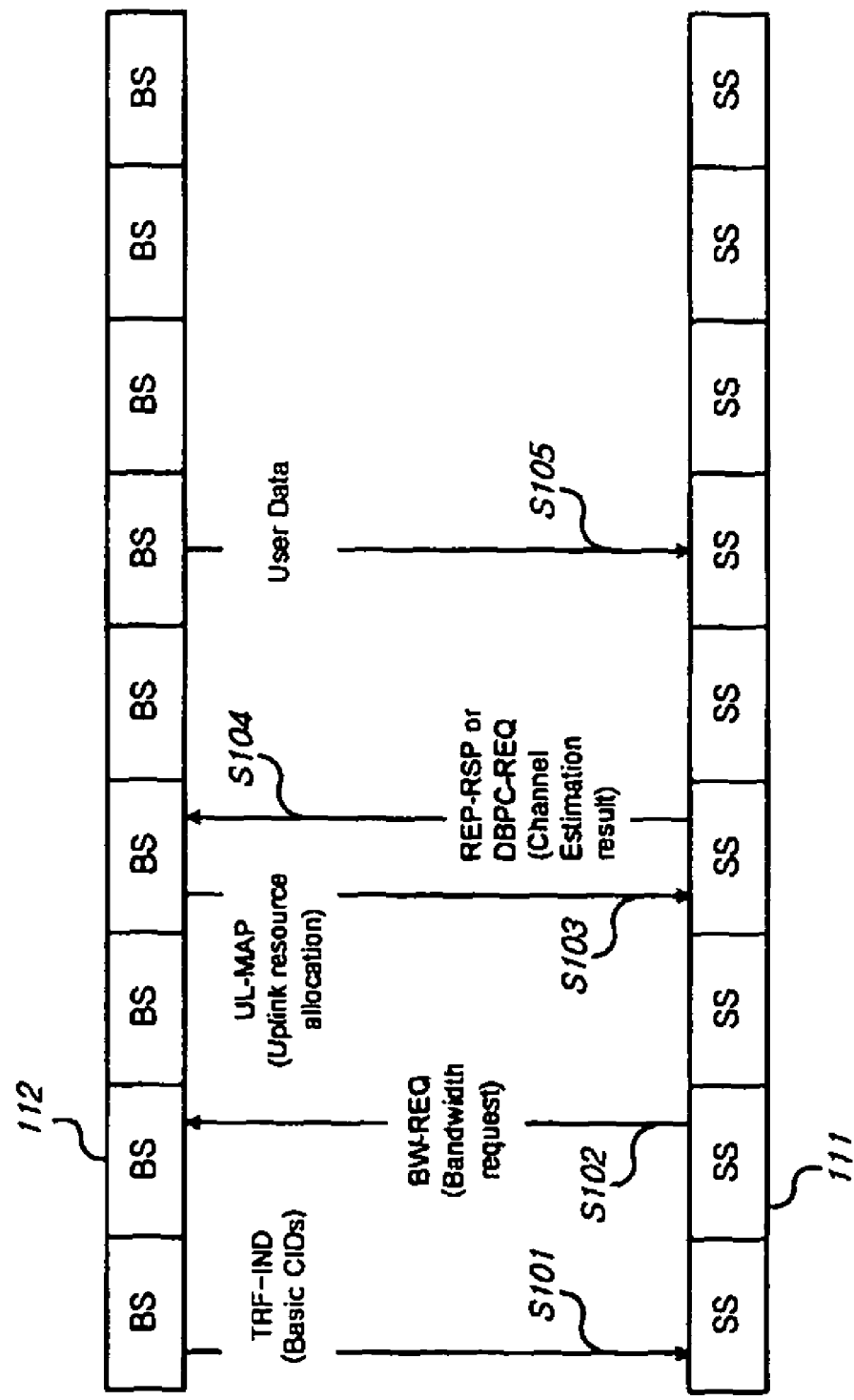
FIG. 1 shows a diagram representing a conventional traffic indication and channel adaptation process for a subscriber station in a sleep mode.
Figure 2:
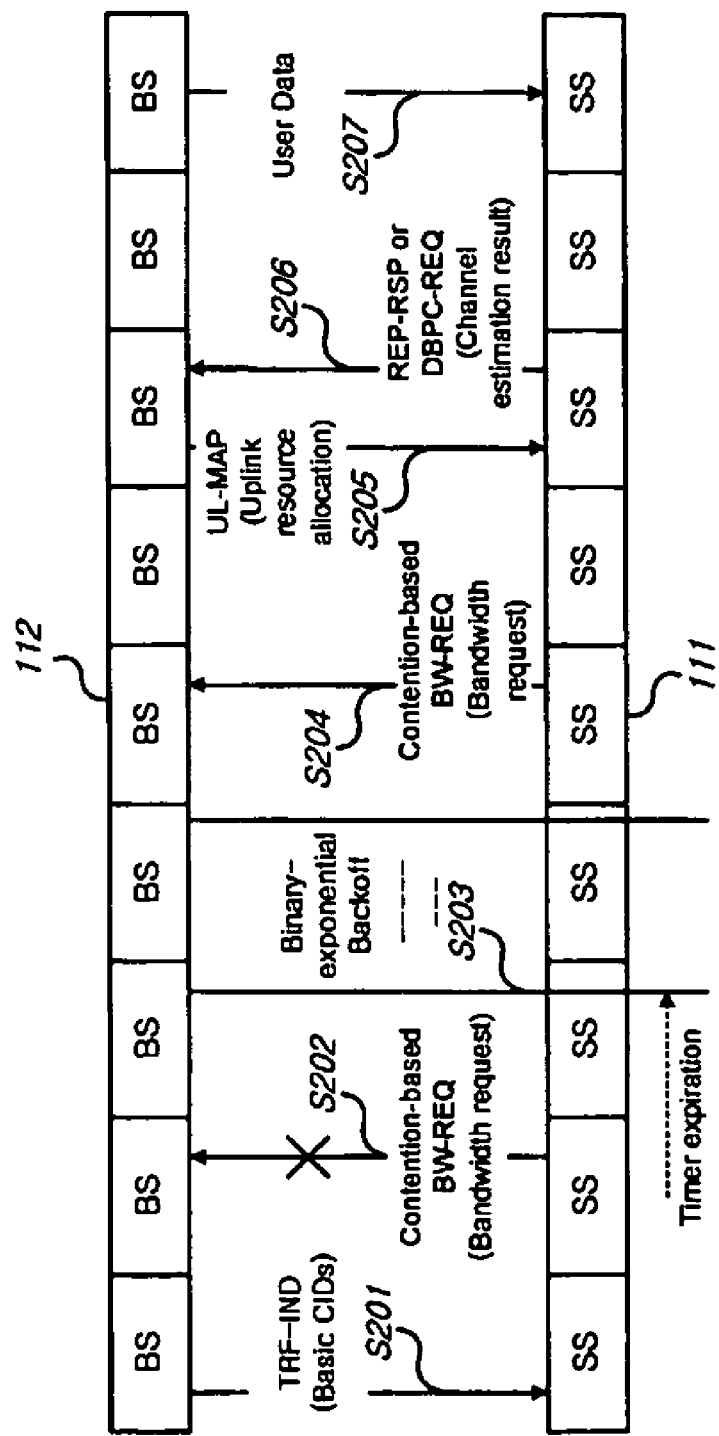
FIG. 2 shows a diagram representing a conventional traffic indication and channel adaptation process for the subscriber station in the sleep mode when a contention based bandwidth is requested.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

In a system providing high-speed mobility, wireless radio channel quality information is very important because an adaptive modulation and channel coding level (AMC level) for a subscriber station is determined by this information. At this time, a subscriber station in the sleep mode may not estimate a channel quality and report the same to a base station, and therefore the base station may not detect the channel quality of the subscriber station in the sleep mode. Even though the subscriber station is awakened by a traffic indication when there is traffic, the base station may not determine an appropriate transmission level and confirm whether the subscriber station receives the traffic indication message when channel quality information (CQI) is not reported from the subscriber station.

In an exemplary embodiment of the present invention, the base station detects the channel quality of the mobile subscriber station according to a latest channel state in a mobile communication or a wireless portable internet system, and thus selects the most efficient modulation and channel coding level when the data is transmitted to the subscriber station. In particular, when the subscriber station is in the sleep mode, the subscriber station is awakened by the traffic indication and controlled to quickly and efficiently report the CQI to the base station, and therefore the base station transmits downlink data having a transmission level determined by applying the adaptive modulation and coding level.

Figure 3:
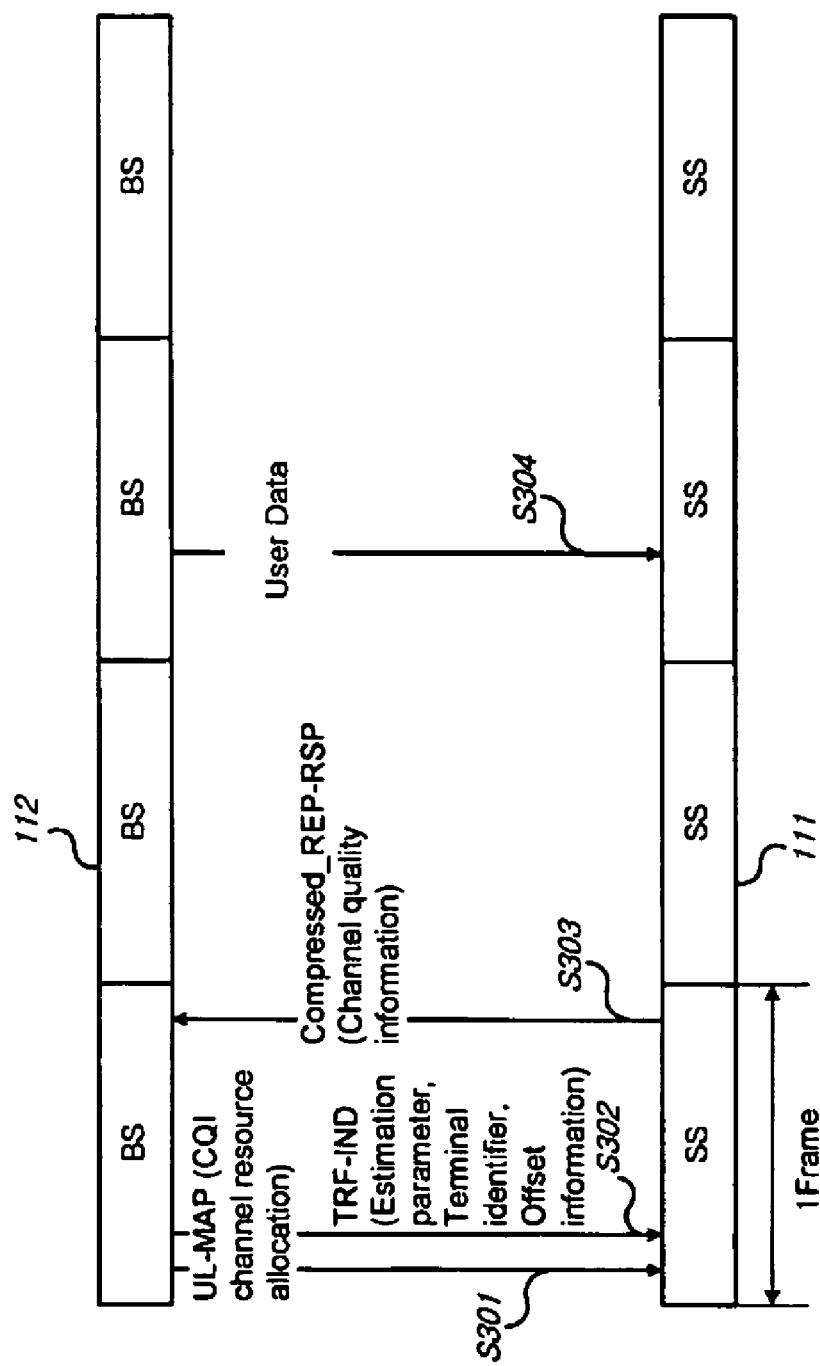
FIG. 3 shows a diagram representing a traffic indication and channel adaptation process of a subscriber station in a sleep mode in a wireless portable internet system according to an exemplary embodiment of the present invention.

FIG. 3 shows a diagram representing a traffic indication and channel adaptation process of the subscriber station in the sleep mode in a wireless portable internet system according to the exemplary embodiment of the present invention.

As shown in FIG. 3, the base station BS allocates a dedicated uplink resource for reporting the CQI transmitted from a plurality of subscriber stations SS by allocating a dedicated uplink channel for reporting the CQI to a subscriber station SS in step S301. That is, the subscriber station SS reliably reports a channel estimation result with minimum information by allowing the subscriber station SS to detect the uplink resource for reporting the channel estimation result. At this time, the subscriber station SS transmits the channel quality estimation result having predetermined information including mean and standard deviation values through the exclusive channel for reporting the CQI.

The base station BS transmits a traffic indication (TRF-IND) message to a subscriber station SS in which the downlink traffic is generated among the plurality of subscriber stations SS in the sleep mode while the base station BS allocates the uplink channel in order to awaken the subscriber station SS a by basic connection identifier (basic CID) information included in the traffic indication (TRF-IND) message in step S302, and controls the CQI to be selectively reported by the subscriber station.

The traffic indication (TRF-IND) message provides usage information of the exclusive channel for reporting the CQI and indicating the traffic to the plurality of subscriber stations by using one message for each frame. The traffic indication (TRF-IND) message includes an estimation parameter, a basic identifier, and offset information.

While a message for resource allocation (e.g. an UL-MAP message) is used for allocating the resource for the exclusive channel quality information channel, information on detailed resource usages is provided by the traffic indication message. That is, a message including the respective identifier information for reporting the CQI is used according to characteristics of the traffic indication (TRF-IND) message using a broadcast message (e.g., a message using a broadcast CID according to the IEEE 802.16).

The subscriber station SS mounts the CQI on a compressed report-response (Compressed_REP-RSP) message or a channel quality information codeword (CQI Codeword) to transmit the mounted CQI through the exclusive channel quality information channel. The subscriber station SS also transmits cyclic redundancy check (CRC) information for guaranteeing reliability through the exclusive CQI channel when the Compressed_REP-REP is transmitted in step S303. The CQI report message is transmitted in a compressed format.

At this time, the compressed report-response (Compressed_REP-RSP) message for reporting the channel quality information request message and channel estimation result may be transmitted in a predetermined frame, and therefore the base station determines the most adaptive modulation and channel coding level by quickly applying to changes of the wireless potable channel environment when the data is transmitted to the subscriber station SS. In FIG. 3, it is exemplified that the compressed report-response (Compressed_REP-RSP) message is transmitted in one frame.

The base station BS transmits the downlink data (user data) by applying the adaptive modulation and channel coding level according to the channel quality information report transmitted from the subscriber station SS in step S304.

Figure 4:
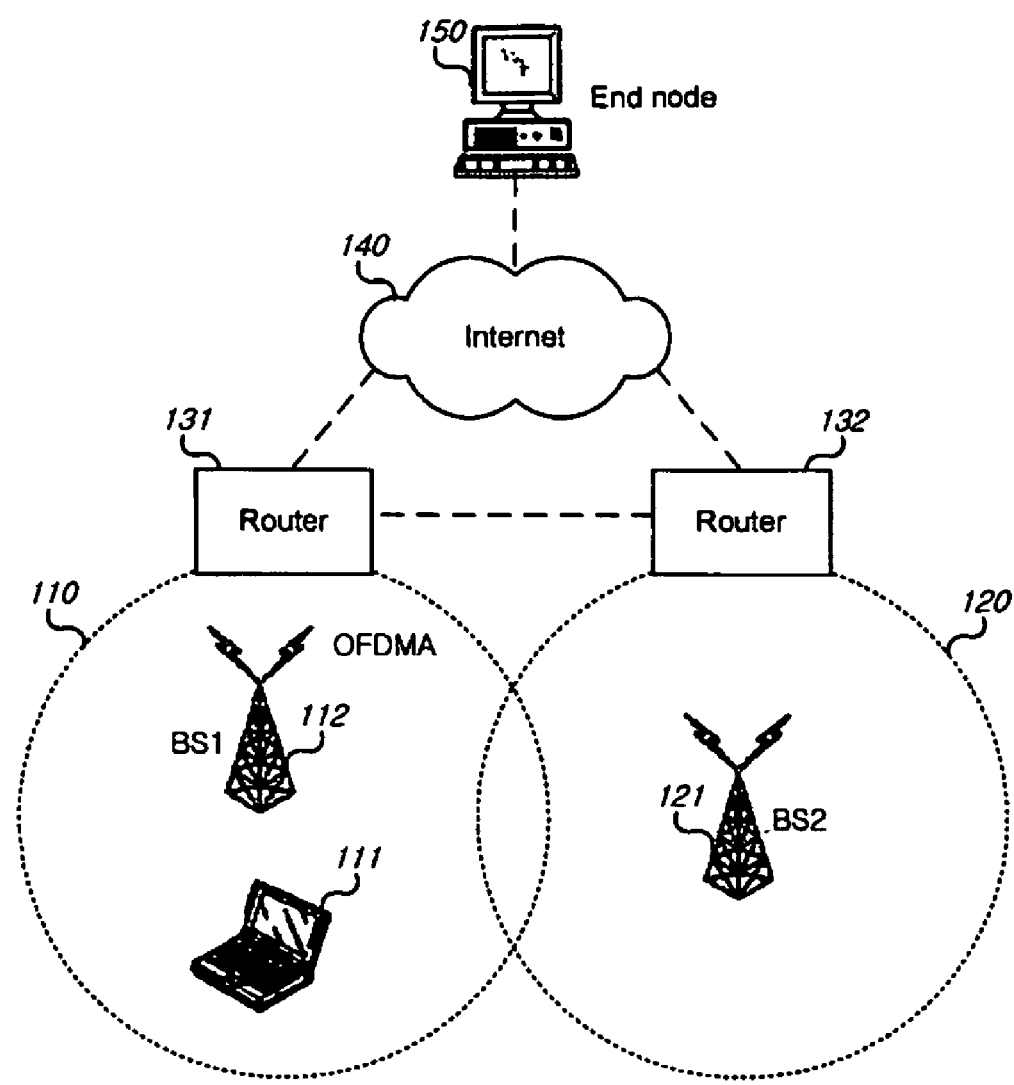
FIG. 4 shows a diagram representing a wireless portable internet system according to the exemplary embodiment of the present invention.

FIG. 4 shows a diagram representing a wireless portable internet system according to the exemplary embodiment of the present invention.

As shown in FIG. 4, the wireless portable internet system includes: a subscriber station 111 in cells 110 and 120; base stations 112 and 121 in the cells 110 and 120 for performing wireless communication with the subscriber station 111; routers 131 and 132 coupled to the base stations 112 and 121 through a gate way; and an internet network 140. 150 denotes an end node of a personal computer PC.

While data communication for performing wireless communication in a short distance centering around a stationary access point is provided in a wireless local area network LAN method according to the conventional IEEE 802.11, it does not provide mobility to the subscriber station SS but only supports a short distance wireless data communication.

In a wireless portable internet system proposed by the IEEE 802.16e group, a seamless data communication service is provided by guaranteeing mobility even when the subscriber station 111 shown in FIG. 4 moves from a cell 110 controlled by the base station 112 to another cell 120 controlled by the base station 121.

The IEEE 802.16e is a standard for supporting a metropolitan area network (MAN), which covers an information communication network in an area between a local area network (LAN) and a wide area network (WAN).

Accordingly, the wireless portable internet system supports a handover operation of the subscriber station 111 in the like manner of a mobile communication service and has dynamic internet protocol (IP) mobility (having same IP address, and moves into and out of a subnet) according to movement of the subscriber station 111.

At this time, the communication is performed between the wireless mobile internet subscriber station 111 and base stations 112 and 121 in an orthogonal frequency division multiple access (OFDMA) method. The OFDMA method is a multiple access method in which a frequency division method, using subcarriers of a plurality of orthogonal frequencies as a plurality of subchannels, is combined with a time division method TDM. The OFDMA has a high data rate and effectiveness against multi-path fading.

In the IEEE 802.16e, the adaptive modulation and coding (AMC) method for adaptively selecting modulation and coding level by a request and an acceptance between the subscriber station 111 and the base stations 112 and 121 is selected.

Figure 5:
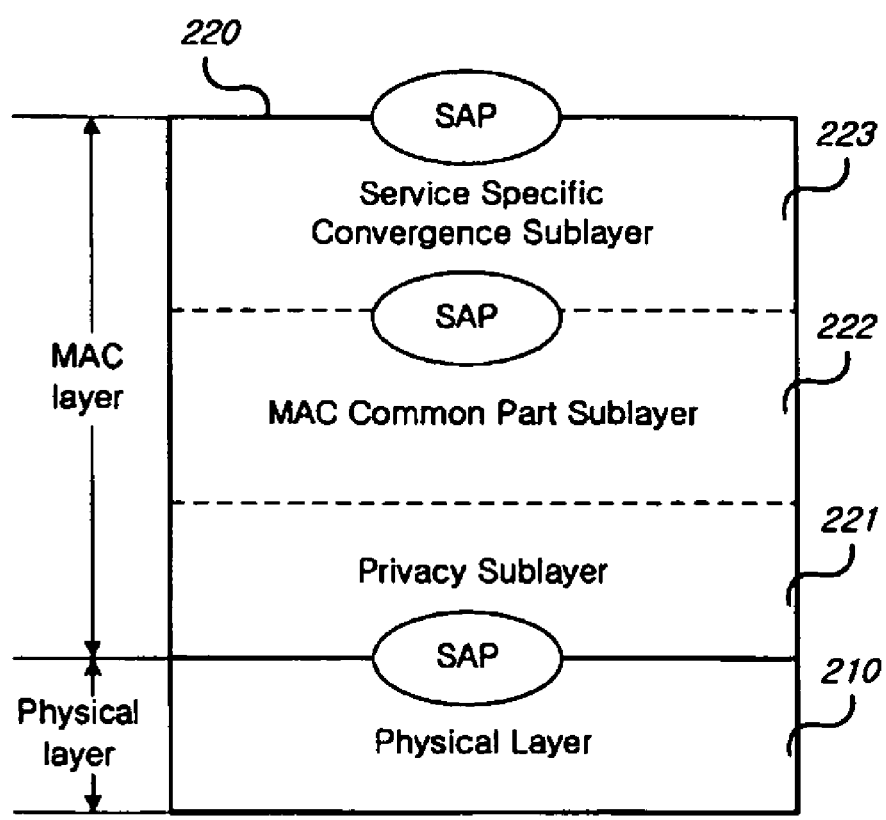
FIG. 5 shows a diagram representing a layer configuration of the wireless portable internet system according to the exemplary embodiment of the present invention.

FIG. 5 shows a diagram representing a layer configuration of the wireless portable internet system according to the exemplary embodiment of the present invention.

As shown in FIG. 5, the layer configuration of the wireless portable internet system according to the IEEE 802.16e includes a physical layer 210 and a media access control (MAC) layer 220, and the respective layers are coupled to each other through a service access point SAP.

The physical layer 210 performs a wireless communication function such as modulating/demodulating and coding functions performed in the conventional physical layer.

While subdivided layers for respective functions are provided in a wired internet system, various functions are performed in one MAC layer in the wireless portable internet system.

The MAC layer is divided into a privacy sublayer 221, a MAC common part sublayer 222, and a service specific convergence sublayer 223 according to respective functions.

The service specific convergence sublayer 223 provides payload header suppression and QoS mapping functions in a seamless data communication.

The MAC common part layer 222 as a core part in the MAC layer performs system access, bandwidth allocation, connection establishment, connection maintenance, and QoS management functions.

The privacy sublayer 221 provides apparatus authentication, secure key exchange, and encryption functions. The apparatus authentication is performed in the privacy sublayer, and user authentication is performed in an upper layer (not illustrated) of the MAC layer.

Figure 6:
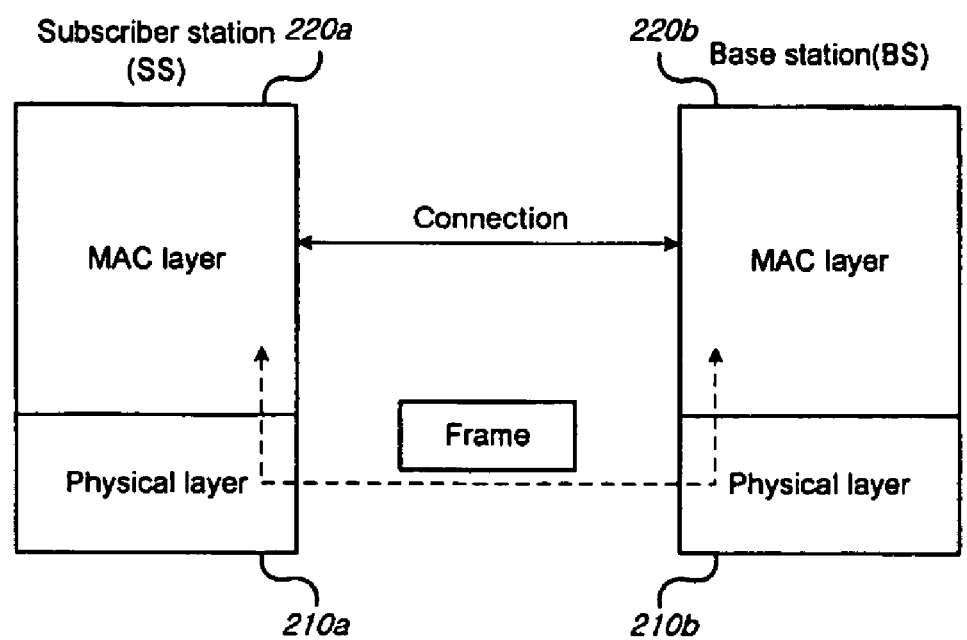
FIG. 6 shows a diagram representing a connection configuration between the base station and the subscriber station in the wireless portable internet system according to the exemplary embodiment of the present invention.

FIG. 6 shows a diagram representing a connection between the base station and the subscriber station in the wireless portable internet system according to the exemplary embodiment of the present invention.

As shown in FIG. 6, there is a connection referred to as Connection C1 between the MAC layer of the subscriber station SS and the MAC layer of the base station BS. At this time, the Connection C1 is not a physical connection but a logical connection, which is defined by a mapping relation between MAC peers of the subscriber station SS and the base station BS in order to transmit traffic for a service flow.

Accordingly, a parameter or a message defined in the Connection C1 defines a function between MAC peer layers. Practically, the parameter or the message is framed to be transmitted through the physical layer, and the frame is parsed to be used for performing a function corresponding to the parameter or the message in the MAC layer.

A MAC message transmitted through the connection includes: a connection identifier (CID) which is a MAC layer address for identifying the connection; a MAP for defining the symbol offset and subchannel offset of a burst which is time-divided on the down/up links by the subscriber station, a number of symbols of allocated resources, and a number of subchannels; and a channel descriptor for describing characteristics of the physical layer according to the characteristics of the down/up links. At this time, the downlink channel descriptor and the uplink channel descriptor are respectively referred to as DCD and UCD.

The MAC message further includes various messages for request REQ, response RSP, and acknowledgement ACK functions.

Figure 7:
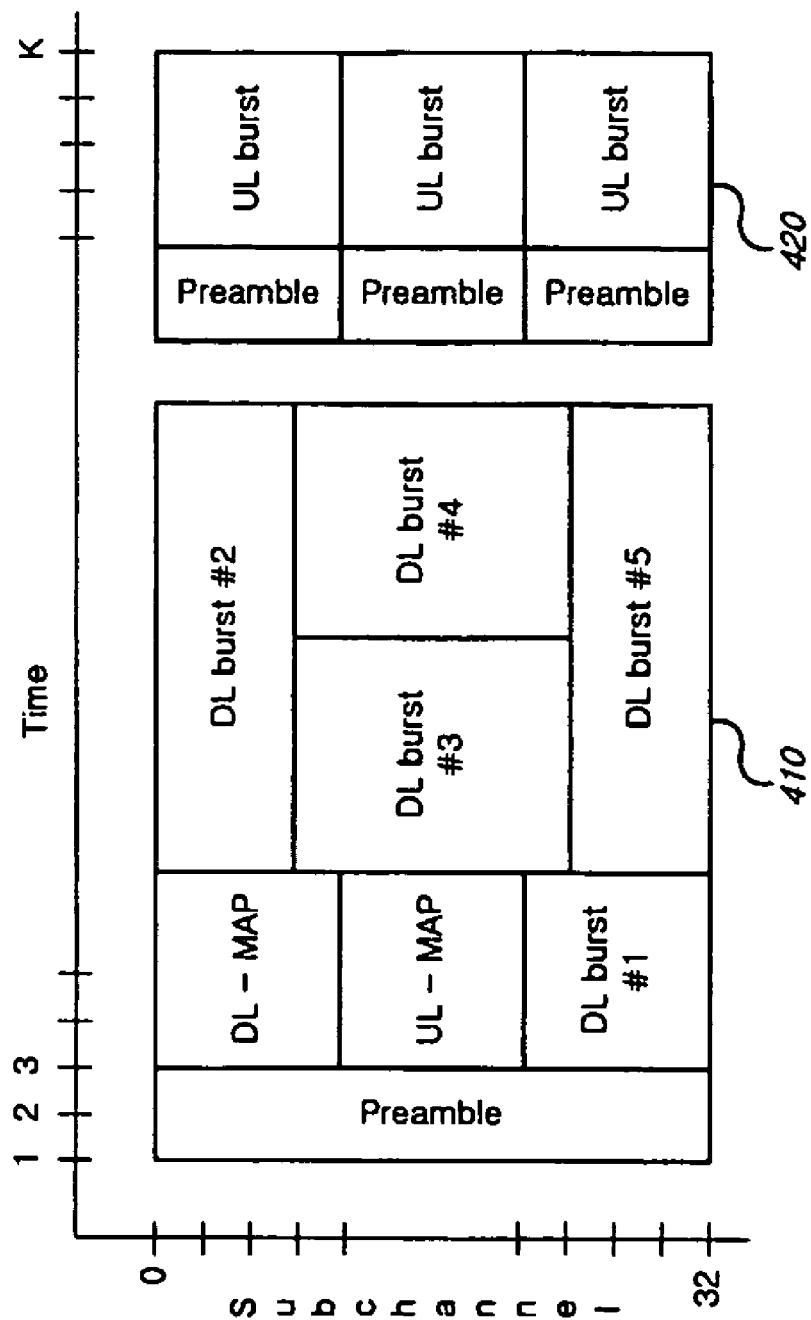
FIG. 7 shows a diagram representing a frame configuration of the wireless portable internet system according to the exemplary embodiment of the present invention.

FIG. 7 shows a diagram representing a frame configuration of the wireless portable internet system according to the exemplary embodiment of the present invention.

As shown in FIG. 7, the frame includes a downlink subframe 410 and an uplink subframe 420 in terms of transmission directions. An axis of ordinates of the frame represents subchannels configured by orthogonal frequencies and an axis of abscissas represents an axis of time which is time-divided.

The downlink subframe 410 includes a preamble, a downlink MAP (DL-MAP), an uplink MAP (UL-MAP), and a plurality of downlink bursts (DL bursts). The downlink bursts do not classify resources or channels for each user, but classify the same according to a transmission level having the same modulation method or channel encoding method.

Accordingly, the downlink MAP has offset information, modulation method information, and coding information for a plurality of users using the same modulation method and channel encoding, and allocates resources for the users. The MAP shows characteristics of the broadcast channel, and requires high robustness.

The transmission is performed for each user in the uplink frame 420, and uplink bursts include information for each user.

Figure 8:
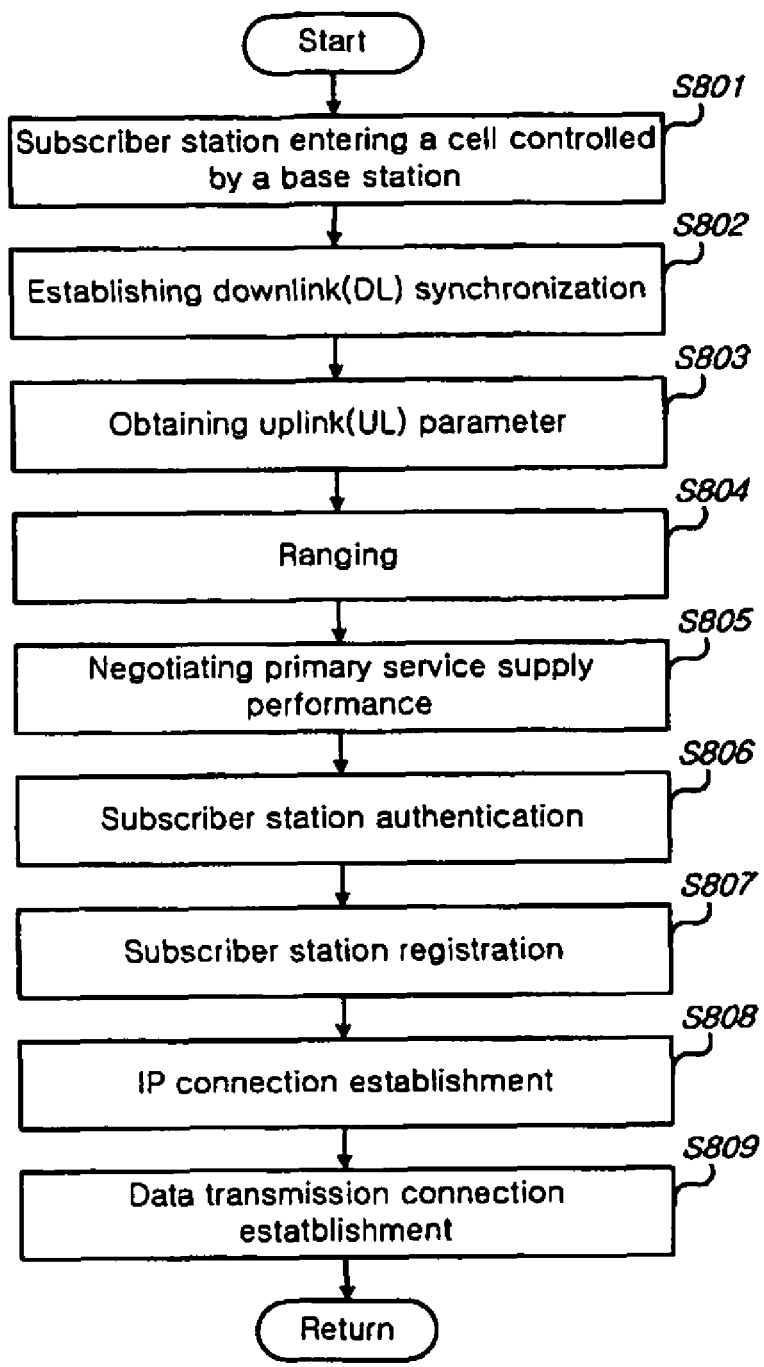
FIG. 8 shows a flow chart representing a process for establishing the connection in the wireless portable internet system according to the embodiment of the present invention.

FIG. 8 shows a flow chart representing an operation of a connection establishment process in the wireless portable internet system according to the embodiment of the present invention.

As shown in FIG. 8, according to the connection establishment process in the wireless portable internet system according to the exemplary embodiment of the present invention, the base station establishes downlink synchronization with the subscriber station in step S802 when the subscriber station enters the cell controlled by the base station in step S801.

When the downlink synchronization is established, the subscriber station obtains an uplink parameter in step S803. For example, the uplink parameter may include a channel descriptor message according to characteristics of the physical layer (e.g., signal to noise ratio).

A ranging operation is performed between the subscriber station and the base station in step S804. The ranging operation is to correct timing, power, and frequency information between the subscriber station and the base station to synchronize them. An initial ranging operation is performed, and then periodic ranging operations are performed.

When the ranging operation is completed, a negotiation about a primary service supply performance for establishing the connection between the subscriber station and the base station is performed in step S805. When the negotiation is completed, the base station performs the subscriber station authentication by using device identifiers such as a certificate and a subscriber station MAC address of the base station in step S806.

When the base station completes the subscriber station authentication is completed and confirms an authorization for using the wireless mobile internet, an apparatus address of the subscriber station is registered in step S807, and IP connection establishment for providing the subscriber station with an IP address from an IP address managing system such as a dynamic host configuration protocol (DHCP) server is performed in step S808.

The subscriber station receiving the IP address performs a connection establishment for transmitting a data in step S809.

Differently from the wireless LAN method, the communication is not performed only around a stationary area in the wireless portable internet system. Mobility covering a metropolitan area is provided, and therefore a battery is used for supplying power to the subscriber station. Therefore, a battery usage time is an important factor in the wireless portable internet system.

The wireless portable internet system according to the IEEE 802.16e has proposed a sleep mode method in order to reduce a battery power usage. The sleep mode method is a method in which a subscriber station enters the sleep mode for a sleep interval for the purpose of reducing power usage of the subscriber station when there is no data to be transmitted to the subscriber station. When the subscriber station is in the sleep mode, the subscriber station performs no operation for receiving data for the sleep interval, and therefore the power usage of the subscriber station is reduced.

At this time, the subscriber station enters a listening mode at each ending point of the sleep interval in order to determines whether there is data waiting to be transmitted to the subscriber station for the next sleep interval.

Figure 9:
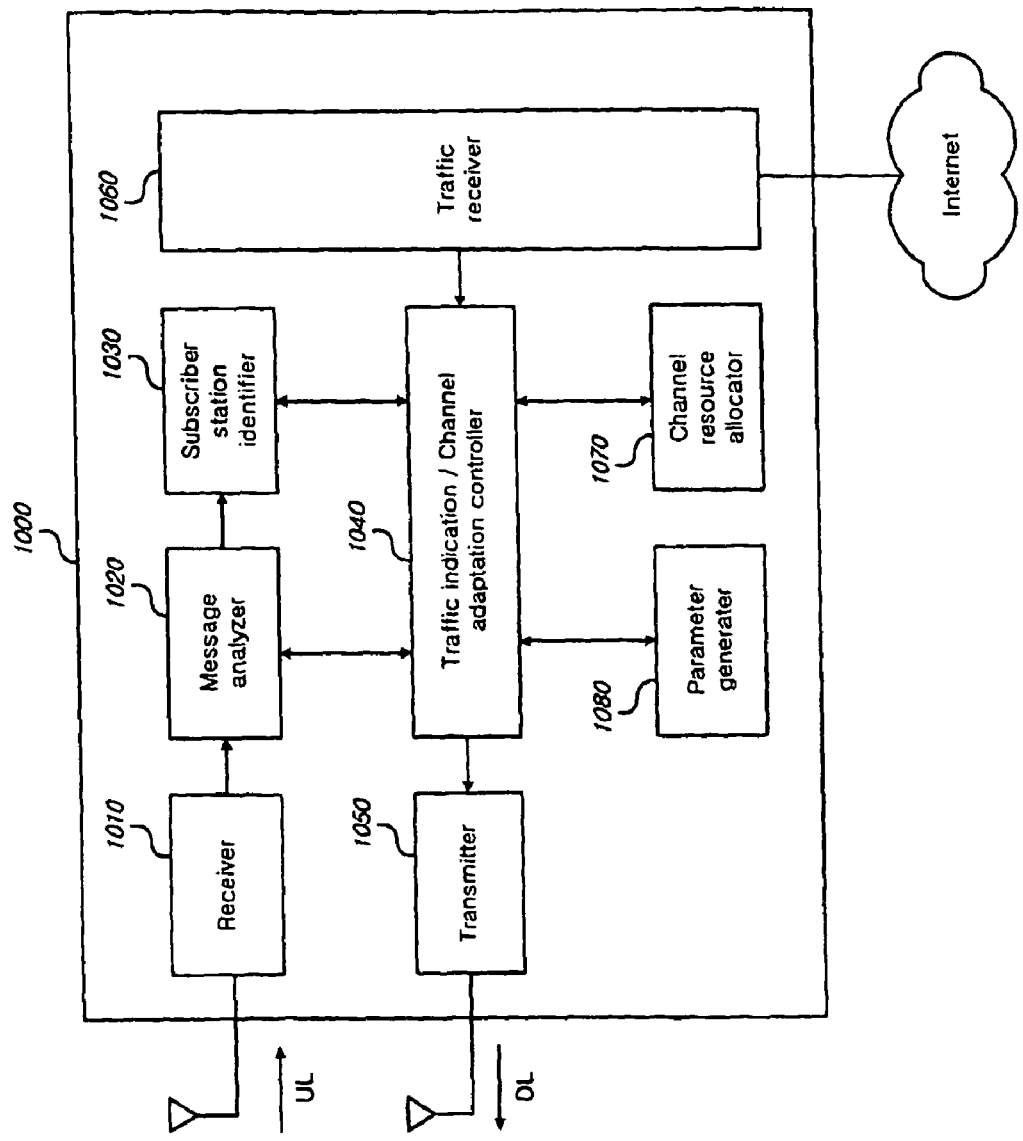
FIG. 9 shows a signal flow chart representing a sleep mode operation in the wireless portable internet system according to the exemplary embodiment of the present invention.

FIG. 9 shows a signal flow chart for representing a sleep mode operation in the wireless portable internet system according to the exemplary embodiment of the present invention.

As shown in FIG. 9, the subscriber station requires getting permission from the base station in order to enter the sleep mode. Accordingly, the subscriber station 111, wishing to enter the sleep mode, requests the sleep mode to the base station 112 by establishing the sleep interval in step S901.

When the subscriber station requests the sleep mode, the base station allocates the sleep interval and accepts the sleep mode for the subscriber station in step S902.

When the base station accepts the sleep mode, the subscriber station enters the sleep mode in which the subscriber station receives no data from a point M of entering the sleep mode in step S903. When an initial sleep interval finishes, the subscriber station enters the listening mode to determine whether there is data waiting to be transmitted from the base station 112 for the sleep interval in step S904.

When there is no data waiting to be transmitted, the base station 112 establishes a message for indicating the presence of data traffic to be 0 and transmits the message to the subscriber station in step S905.

The subscriber station having acknowledged there is no data traffic enters the sleep mode in step S906. The sleep interval may be equal to or less than the initial sleep interval according to the establishment.

When there is data waiting to be transmitted to the subscriber station 111 for the second sleep interval, the base station buffers the data traffic in step S908. The presence of the buffered data is indicated when the subscriber station 111 is in the listening mode.

The base station 112 establishes the message for indicating the presence of data traffic to be 1 to transmit the message to the subscriber station in step S909, and the subscriber station 111 finishes the sleep mode when the subscriber station 111 acknowledges there is data traffic to be transmitted to the subscriber station 111 in the listening mode of step S907. The subscriber station 111 then enters an awake mode, receives the buffered data traffic, and performs data communication with the base station 112 in step S910.

As described, unnecessary power consumption is prevented because the subscriber station 111 is in the sleep mode when there is no data to be transmitted to the subscriber station 111.

Figure 10:
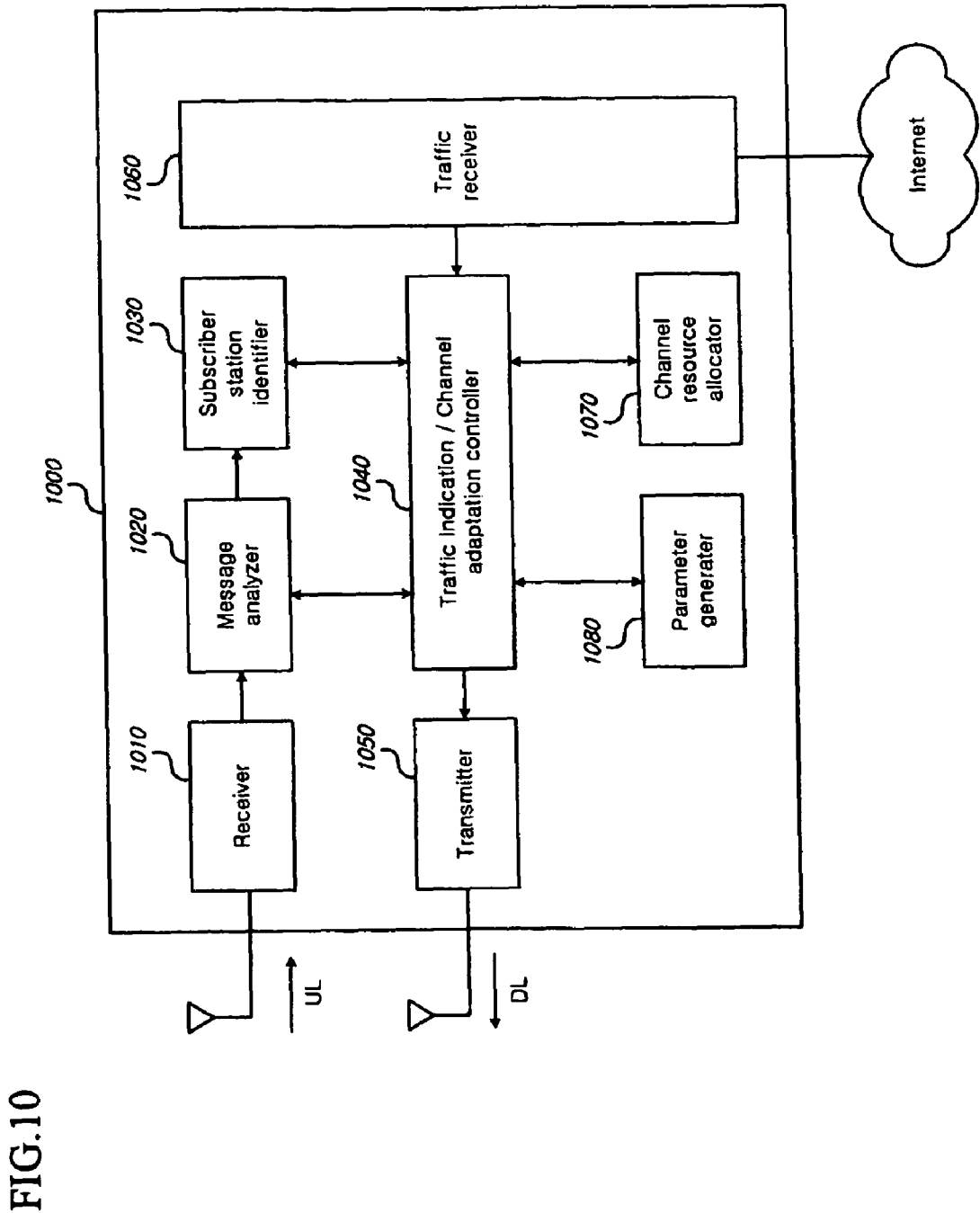
FIG. 10 shows a diagram representing a traffic indication and channel adaptation apparatus for the subscriber station in the sleep mode in the wireless portable internet system according to the exemplary embodiment of the present invention.

FIG. 10 shows a diagram representing a traffic indication and channel adaptation apparatus for a subscriber station in a sleep mode in the wireless portable internet system according to the exemplary embodiment of the present invention. The traffic indication and channel adaptation apparatus includes a receiver 1010, a message analyzer 1020, a subscriber station identifier 1030, a traffic indication and channel adaptation controller 1040, a transmitter 1050, a traffic receiver 1060, a channel resource allocator 1070, and a parameter generator 1080.

As shown in FIG. 10, the traffic indication and channel adaptation apparatus for a subscriber station in a sleep mode in the wireless portable internet system according to the exemplary embodiment of the present invention is realized in the base station BS.

The channel resource allocator 1070 generates a resource allocation information (MAP) and transmits the information to the traffic indication and channel adaptation controller 1040 in order to allocate an uplink resource to a subscriber station SS. The resource allocation information (MAP) for allocating the uplink resource is transmitted to the subscriber station SS together with the traffic indication (TRF-IND) message.

The parameter generator 1080 generates and provides a basic connection identifier (Basic CID) for listing the respective subscriber stations SS. The basic connection identifier (Basic CID) is transmitted within the traffic indication (TRF-IND) message.

The traffic indication and channel adaptation controller 1040 generates the traffic indication (TRF-IND) message including the parameter generated in the parameter generator 1080 and awakens the subscriber station in the sleep mode. In addition, the traffic indication and channel adaptation controller 1040 controls the resource allocation information (MAP) provided from the channel resource allocator 1070 to be transmitted together with the traffic indication (TRF-IND) message to the subscriber station SS (a traffic indication and the channel quality according to the traffic indication may be reported in one frame. However, when the report is performed in a next frame, the resource allocation information (UL-MAP) is transmitted in the next frame). The traffic indication and channel adaptation controller 1040 also establishes an exclusive channel quality information report channel for each subscriber station SS, and provides information to be selectively estimated and reported to a subscriber station requiring a quick data transmission. At this time, the traffic indication (TRF-IND) message may include an estimation parameter, a terminal identifier, and offset information.

The transmitter 1050 transmits the traffic indication (TRF-IND) message and the uplink resource allocation information (UL-MAP) to the subscriber station SS under the control of the traffic indication and channel adaptation controller 1040. When the traffic indication and channel adaptation controller 1040 determines a transmission level by applying the adaptive modulation and channel coding level according to the channel quality information report transmitted from the subscriber station SS, the transmitter 1050 transmits a downlink data (User Data) having the determined transmission level.

The traffic receiver 1060 receives the traffic information through the network, and establishes an indicator for the traffic indication of the subscriber station SS in order that the traffic indication and channel adaptation controller 1040 may control the subscriber station SS in the sleep mode to enter the awake mode.

The receiver 1010 receives the channel quality information report message when the subscriber station SS receiving the traffic indication message enters from the sleep mode to the awake mode. At this time, the channel quality information report message may include cyclic redundancy check (CRC) information for guaranteeing reliability, and may be transmitted through the exclusive channel quality information channel.

The message analyzer 1020 analyzes the channel quality report message and transmits the analyzed message to the traffic indication and channel adaptation controller 1040 and the subscriber station identifier 1030. The subscriber station identifier 1030 identifies the transmitted identifier of the subscriber station and transmits the identified identifier to the traffic indication and channel adaptation controller 1040

Accordingly, the traffic indication and channel adaptation controller 1040 generates the downlink data by applying the adaptive modulation and channel coding level according to the channel quality report message analyzed by the message analyzer 1020. At this time, the description of the adaptive modulation and channel coding level will be omitted because it is clear that those skilled in the art would easily realize the adaptive modulation and channel coding level according to the IEEE 802.16e applying the adaptive modulation and coding (AMC) in which the modulation and coding level is adaptively selected by the request/acceptance between the subscriber station SS in the sleep mode and the base station BS.

FIG. 11 shows examples of the compressed channel quality information report message (Compressed_Report_Response_Message) format on an exclusive channel for reporting the channel quality information and the traffic indication (TRF-IND) message format of the subscriber station in the sleep mode in the wireless portable internet system according to the exemplary embodiment of the present invention.

As shown in FIG. 11, the traffic indication (TRF-IND) message is transmitted including the basic connection identifier (Basic CID) for identifying each subscriber station as a parameter. At this time, to transmit the traffic indication message including the basic connection identifier, two methods may be used: a method for listing the basic connection identifiers (Basic CIDs) to indicate the list; and a method for providing a flag in a bitmap method according to a predetermined order of the identifiers.

The subscriber station in the sleep mode is awakened by the traffic indication (TRF-IND) message. The request information for estimation and report is selectively provided to a subscriber station requiring a fast data transmission. That is, the channel quality information is first reported to the subscriber station requiring the fast data transmission according to the traffic indication and characteristics of a service provided to each terminal. Therefore the base station efficiently performs a scheduling operation for the resource allocation.

The subscriber station transmits the channel quality information in a predetermined frame with less overhead operation of the message transmission compared to a case in which each subscriber station separately transmits the channel quality information, and therefore the adaptive modulation and coding is appropriately performed.

The subscriber station receiving the information shown in FIG. 11 is awakened when there is a traffic indication for the subscriber station, and reports an estimation result of the frame to the base station. When a flag is provided, the subscriber station acknowledges the resource allocated on the uplink for reporting the estimation result by the information on how many subscriber stations are arranged before the subscriber station.

In the exemplary embodiment of the present invention, the subscriber station provides the uplink resource allocation information for reporting the traffic indication message and the channel quality information at the same time to thus quickly and reliably transmit the report on the channel quality information and the acknowledgement while minimizing the signaling overhead. The traffic indication and channel quality information on the subscriber station in the sleep mode is then quickly and efficiently provided in order to apply the adaptive modulation and coding level when the data is transmitted to the subscriber station.

Figure 12:
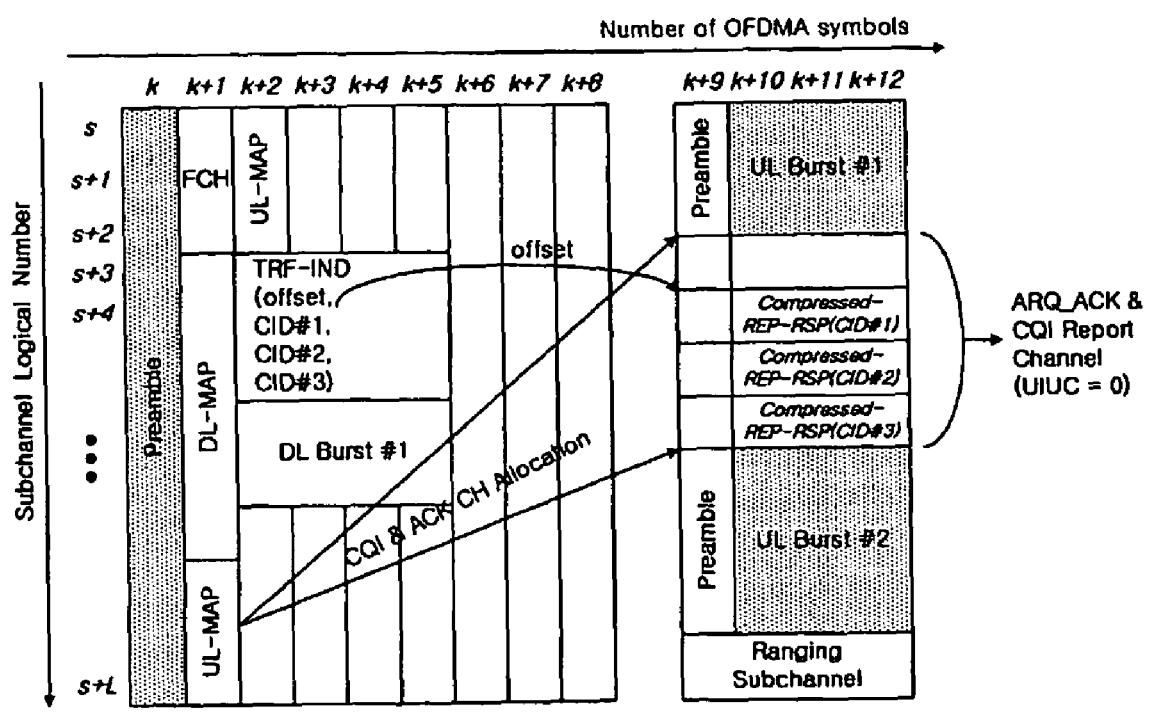
FIG. 12 shows a diagram describing the traffic indication and channel adaptation process of the subscriber station in the sleep mode in the wireless portable internet system according to the exemplary embodiment of the present invention.

FIG. 12 shows a diagram describing the traffic indication and channel adaptation process of the subscriber station in the sleep mode in the wireless portable internet system according to the exemplary embodiment of the present invention. The diagram represents that the subscriber station in the sleep mode receiving the traffic indication (TRF-IND) message is realized in an OFDMA-physical layer such that the subscriber station in the sleep mode may transmit the channel quality information report (Compressed_REP-RSP) message or the channel quality information codeword through the exclusive channel for the allocated channel quality information report.

As shown in FIG. 12, the subscriber station receiving the indicated basic connection identifier (Basic CID list or bitmap) in the traffic indication (TRF-IND) message acknowledges resources to be used by the subscriber station in a predetermined channel quality information report exclusive channel (ARQ_ACK & CQI Report Channel Allocation) of the resource allocation information (UL-MAP), and transmits a compressed estimation result response (Compressed_REP-RSP for CID #1, #2, #3) message and a channel quality information codeword to the base station. In the exemplary embodiment of the present invention, an uplink interval usage code (UIUC) of the exclusive channel quality information report channel (ARQ_ACK & CQI Report Channel Allocation) is established to be 0.

Accordingly, the exemplary embodiment of the present invention provides the acknowledge function for determining whether the subscriber station in the sleep mode receives the traffic indication for the subscriber station according to the channel quality information report message, and therefore the downlink data is transmitted to the subscriber station acknowledging that the traffic indication has been received, and the uplink resource through which the subscriber station transmits the channel quality information is efficiently allocated when the traffic is indicated in order to determine a modulation and channel coding level to be used when the data is transmitted to the subscriber station by quickly applying the channel environment.

According to the exemplary embodiment of the present invention, the overhead of the uplink resource is minimized when the channel quality information is transmitted, and the reliability of the channel quality information is guaranteed. In addition, the channel quality information of a subscriber station requiring a fast data transmission is first reported according to the indication of the traffic and the characteristics of a service provided to each subscriber station, and therefore the base station efficiently performs a scheduling operation for the resource allocation.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

According to the present invention, the reliable channel quality information is quickly and efficiently provided in order to determine a modulation and channel coding level to be used when the subscriber station in the sleep mode is awakened by the traffic indication and the data from the subscriber station is transmitted in the mobile communication or wireless portable internet system in the wireless portable environment.

The subscriber station transmits the channel quality information in a predetermined frame with less overhead operation of the message transmission compared to a case in which each subscriber station separately transmits the channel quality information, and therefore the adaptive modulation and coding is appropriately performed.

According to the present invention, the reliable channel quality information is quickly and efficiently provided by transmitting the compressed estimation result response (Compressed_REP-REP) message with the CRC in order to guarantee the estimation result and the reliability without any unnecessary header information.

According to the present invention, a value of the channel quality information is efficiently transmitted with minimized operation overhead when the channel quality information codeword is transmitted.

What is claimed is:

1. A traffic indication and channel adaptation apparatus for a subscriber station in a sleep mode in a wireless portable internet system, comprising:
    a channel resource allocator for generating resource allocation information allocating an uplink channel resource to the subscriber station in the sleep mode;
    a traffic indication and channel adaptation controller for generating a traffic indication (TRF-IND) message transmitted together with the resource allocation information to the subscriber station in the sleep mode, and providing downlink data (user data) having a transmission level determined by applying an adaptive modulation and coding (AMC) according to a channel quality information report message transmitted from the subscriber station in the sleep mode;
    a transmitter for transmitting the uplink resource allocation information, the traffic indication message, and the downlink data (user data) to the subscriber station in the sleep mode; and
    a receiver for receiving a channel quality information codeword (CQI Codeword) and a channel quality information report (compressed REP-RSP) message transmitted from the subscriber station in the sleep mode awakened by the traffic indication message.

2. The traffic indication and channel adaptation apparatus of claim 1, wherein the resource allocation information and the traffic indication (TRF-IND) message are transmitted from the base station to the subscriber station at the same time or with a predetermined frame offset.

3. The traffic indication and channel adaptation apparatus of claim 1, further comprising a parameter generator for generating a basic connection identifier and a sleep mode identifier bitmap for listing the respective subscriber station in the sleep mode.

4. The traffic indication and channel adaptation apparatus of claim 3, wherein the basic connection identifier and sleep mode identifier bitmap are included in the traffic indication (TRF-IND) message to be transmitted.

5. The traffic indication and channel adaptation apparatus of claim 1, wherein the traffic indication (TRF-IND) message comprises an estimation parameter, a terminal identifier, and offset information.

6. The traffic indication and channel adaptation apparatus of claim 1, wherein the traffic indication and channel adaptation controller establishes a dedicated channel for reporting channel quality information to the subscriber station in the sleep mode.

7. The traffic indication and channel adaptation apparatus of claim 6, wherein the information for reporting the channel quality information is detected according to an order of the listed subscriber stations in the sleep mode.

8. The traffic indication and channel adaptation apparatus of claim 1, wherein the traffic indication and channel adaptation controller provides request information for estimation and report to a subscriber station requiring a fast data transmission from among the subscriber stations in the sleep mode.

9. The traffic indication and channel adaptation apparatus of claim 1, wherein the channel quality information report message or the channel quality information codeword is used as an acknowledgement (ACK) of a traffic indication message for the subscriber station in the sleep mode.

10. The traffic indication and channel adaptation apparatus of claim 9, wherein the channel quality information report message comprises information factors of predetermined values comprising a mean values and a standard deviation value according to the channel quality information estimation method, and is transmitted through a channel for reporting the uplink channel quality information.

11. The traffic indication and channel adaptation apparatus of claim 9, wherein the channel quality information report message comprises channel quality information (CQI) and cyclic redundancy check (CRC) information.

12. The traffic indication and channel adaptation apparatus of claim 1, further comprising:
    a traffic receiver for receiving traffic information through a network, and establishing an indicator indicating traffic to the subscriber station in the sleep mode so that traffic indication and channel adaptation controller may control the subscriber station in the sleep mode to enter the awake mode;
    a message analyzer for analyzing the channel quality information codeword or the channel quality information report message transmitted from the subscriber station in the sleep mode; and
    a subscriber station identifier for identifying the transmitted basic connection identifier of the subscriber station in the sleep mode.

13. A method for traffic indication and channel adaptation for a subscriber station in a sleep mode in a wireless portable internet system, comprising:
    a) a base station generating a traffic indication (TRF-IND) message having indication information for a subscriber station in which downlink traffic is generated among a plurality of subscriber stations in the sleep mode;
    b) the base station allocating a dedicated uplink channel for reporting channel quality information to the subscriber station;
    c) the base station transmitting the traffic indication (TRF-IND) message and the dedicated uplink channel allocation information to the subscriber station, and awakening the subscriber station by the traffic indication (TRF-IND) message;
    d) the base station receiving a channel quality information report message and a channel quality information codeword (CQI Codeword) from the subscriber station through the dedicated channel quality information channel; and e) the base station transmitting downlink data (user data) having a transmission level determined by applying an adaptive modulation and channel coding according to the channel quality information report provided by the subscriber station to the subscriber station.

14. The method of claim 13, wherein the traffic indication (TRF-IND) message provides dedicated channel usage information for reporting the traffic indication and the channel quality information to the subscriber stations at the same time by one message for each frame when the base station generates a traffic indication (TRF-IND) message.

15. The method of claim 13, wherein the traffic indication (TRF-IND) message comprises an estimation parameter, a terminal identifier, and offset information when the base station generates a traffic indication (TRF-IND) message.

16. The method of claim 13, wherein the traffic indication message is a broadcast message comprising identifier information of each subscriber station for reporting the channel quality information.

17. The method of claim 16, wherein the terminal identifiers are listed to be indicated and a flag is provided in a bitmap method according to a predetermined order of the identifiers.

18. The method of claim 13, wherein a message for an uplink resource allocation is used to allocate a resource to the dedicated channel quality information channel, and detailed information on the resource usage is provided through the traffic indication message when the base station allocates the exclusive uplink channel.

19. The method of claim 13, wherein the uplink resource is allocated for the purpose of transmitting the dedicated channel quality information for reporting the channel information transmitted from the subscriber stations at the same time when the base station allocates the dedicated uplink channel.

20. The method of claim 13, wherein the subscriber station is specified to selectively report the channel quality information when the base station transmits the traffic indication (TRF-IND) message and the dedicated uplink channel allocation information.

21. The method of claim 13, wherein a channel quality information codeword (CQI Codeword) and the channel quality information report (Compressed_REP-RSP) message are transmitted in a predetermined frame offset.

22. A method for indicating traffic for a subscriber station in a sleep mode in a wireless portable internet system, comprising:
a) a base station generating a traffic indication (TRF-IND) message having indication information for a subscriber station in which downlink traffic is generated among a plurality of subscriber stations in the sleep mode;
b) the base station allocating an exclusive uplink channel for reporting channel quality information to the subscriber station;
c) the base station transmitting the traffic indication (TRF-IND) message and exclusive uplink channel allocation information (MAP), and awakening the subscriber station in the sleep mode by the traffic indication (TRF-IND) message; and
d) the base station receiving a channel quality information report (Compressed_REP-RSP) message or a channel quality information codeword (CQI Codeword) according to channel quality changes of the subscriber station as a response to the traffic indication (TRF-IND) message through the channel quality information exclusive channel from the subscriber station awakened from the sleep mode.

23. The method of claim 22, wherein request information to be estimated and reported is selectively provided to a subscriber station requiring a fast data transmission among the subscriber stations in the sleep mode when the base station transmits the traffic indication (TRF-IND) message and the exclusive uplink channel allocation information (MAP).

24. A method for channel adaptation for a subscriber station in a sleep mode in a wireless portable internet system, comprising:
a) a base station generating a traffic indication (TRF-IND) message having indication information for a subscriber station in which a downlink traffic is generated among a plurality of subscriber stations in the sleep mode;
b) the base station allocating an exclusive uplink channel for reporting channel quality information to the subscriber station;
c) the base station transmitting the traffic indication (TRF-IND) message and exclusive uplink channel allocation information (MAP), and awakening the subscriber station in the sleep mode by the traffic indication (TRF-IND) message;
d) the base station receiving a channel quality information report (Compressed_REP-RSP) message or a channel quality information codeword (CQI Codeword) according to channel quality changes of the subscriber station as a response to the traffic indication (TRF-IND) message through the channel quality information exclusive channel from the subscriber station awakened from the sleep mode
e) the base station applying an adaptive modulation and channel coding level according to the channel quality information report (Compressed_REP-RSP) message or the channel quality information codeword (CQI Codeword); and
f) the base station transmitting a downlink data having a transmission level determined by applying the adaptive modulation and channel coding to the subscriber station in the sleep mode.

25. The method of 24, further comprising the base station transmitting the data at the transmission level to the subscriber station receiving the downlink data.

* * * * *